United States Patent [19]

Watson et al.

[11] 4,183,906

[45] Jan. 15, 1980

[54] OXYGEN-ENRICHMENT COLUMNAR ABSORPTION PROCESS FOR MAKING NITRIC ACID

[75] Inventors: Richard W. Watson, Derby; Philip G. Blakey, Derbyshire, both of England

[73] Assignee: BOC Limited, London, England

[21] Appl. No.: 915,861

[22] Filed: Jun. 15, 1978

[30] Foreign Application Priority Data

Jun. 16, 1977 [GB] United Kingdom ............... 25269/77

[51] Int. Cl.$^2$ .............................................. C01B 21/40
[52] U.S. Cl. ..................................... 423/392; 423/393
[58] Field of Search ...................... 423/392, 393, 394

[56] References Cited

U.S. PATENT DOCUMENTS

| | | | |
|---|---|---|---|
| 1,338,417 | 4/1920 | Bergue | 423/393 |
| 1,991,452 | 2/1935 | Fauser | 423/392 |
| 2,046,162 | 6/1936 | Handforth et al. | 423/392 |
| 3,081,153 | 3/1963 | Parsons | 423/392 |
| 3,464,788 | 9/1969 | LaCroix | 423/392 |
| 3,716,625 | 2/1973 | Oberste-Berglaus et al. | 423/392 |
| 3,927,182 | 12/1975 | Powell | 423/392 |

FOREIGN PATENT DOCUMENTS

| | | | |
|---|---|---|---|
| 758417 | 10/1956 | United Kingdom | 423/393 |
| 803211 | 10/1958 | United Kingdom . | |
| 910131 | 11/1962 | United Kingdom | 423/394 |
| 1051100 | 12/1966 | United Kingdom . | |
| 1064275 | 4/1967 | United Kingdom | 423/393 |

*Primary Examiner*—G. O. Peters
*Attorney, Agent, or Firm*—Dennison, Dennison, Meserole & Pollack

[57] ABSTRACT

An improved process for the manufacture of nitric acid involving catalytic oxidation of ammonia and passage of the resulting nitric oxide through columnar absorption zones, the improvement particularly comprising oxygen-enrichment of that gas passing through the absorption zones at one or more regions of the zones wherein the absorption reaction is from 50 to 90% complete. Further, the invention contemplates the oxygen-enrichment of bleaching air and a reduction in the rate at which bleaching air or other air is taken to form secondary air. The invention results in improved production rates of nitric acid and reductions in the concentration of nitrogen oxides in vent gas.

12 Claims, 1 Drawing Figure

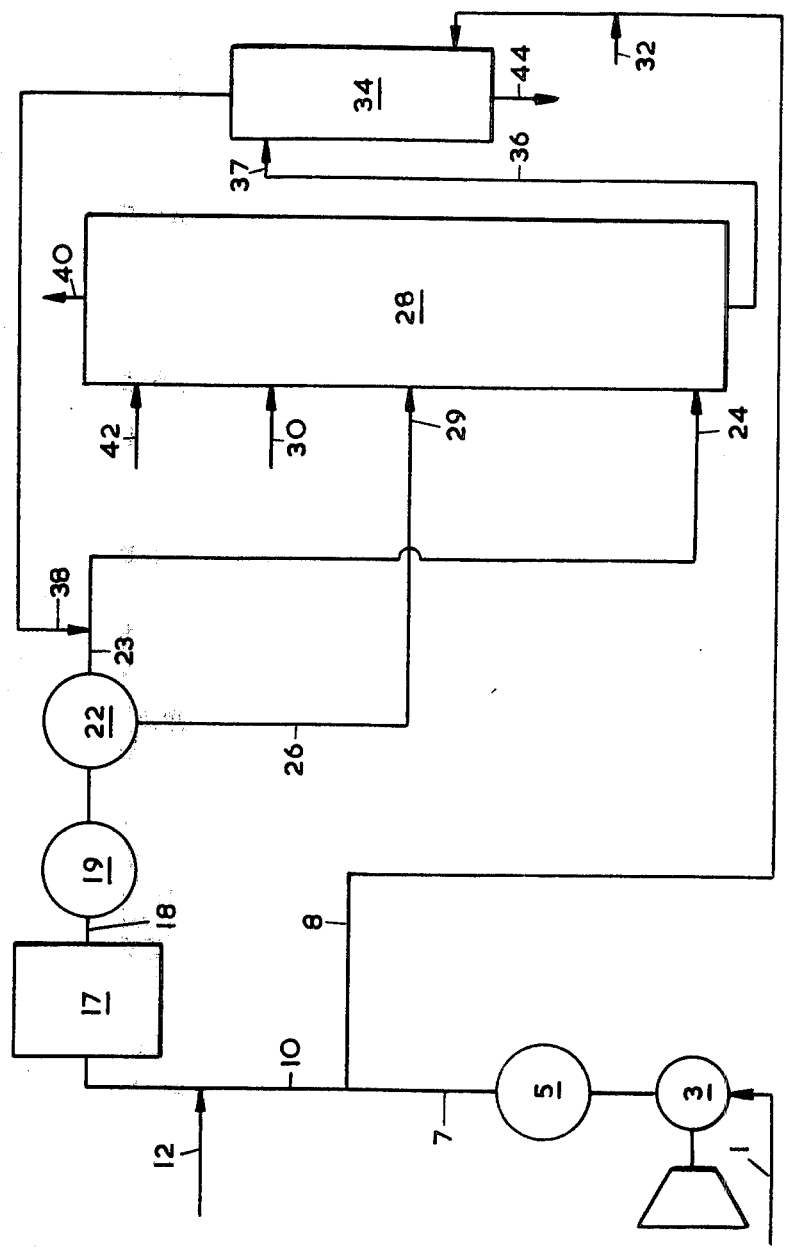

OXYGEN-ENRICHMENT COLUMNAR ABSORPTION PROCESS FOR MAKING NITRIC ACID

The oxygen-enriched bleaching air preferably contains from 25 to 45% by volume of air.

The ratio $$(A_B+A_E)/(A_B+A_E+A_P)$$

expressed as a percentage is preferably in the range 5 to 12% wherein:

$A_B$ represents the rate at which air is taken to form the bleaching air;

$A_E$ represents the rate at which air is added to the bleaching air to form the secondary air, and $A_P$ represents the rate at which the primary air enters the catalytic reaction zone(s).

This invention relates to a gas-liquid contact process for producing nitric acid from a gas mixture formed by the catalytic oxidation of ammonia. One conventional process for making nitric acid includes the steps of oxidising ammonia by air to nitric oxide and water vapour in a catalytic burner (the catalyst typically being platinum/rhodium) at a temperature in the order of 900° C.

The reaction products from the burner typically contain 9% by volume of nitric oxide, 70% by volume of nitrogen, 14% by volume of water and 7% by volume of oxygen. They are cooled, typically in two stages, to below a temperature at which the water vapour condenses. Reaction between the water and the nitric oxide and nitrogen results in the condensate being a dilute solution of nitric acid. First, nitric oxide reacts with oxygen to form nitrogen dioxide which is an equilibrium with its dimer dinitrogen tetroxide. Then, the nitrogen dioxide reacts with the water to form nitric acid.

The unreacted gases are passed into the bottom section of at least one absorption column or other gas/liquid contact device in which the ascending gases are contacted with a descending flow of water. The dilute nitric acid from the condenser is introduced into the or each column at an intermediate level.

The nitric oxide reacts with oxygen from the air in the or each column to form dinitrogen tetroxide which reacts with water to form nitric acid. Accordingly, as the water descends the or each column so it becomes richer in nitric acid. The product leaving the bottom of the column typically contains from 50 to 70% by weight of nitric acid.

It is found, however, that this products tend typically to have dissolved impurities in it owing to the presence of unoxidised nitric oxide and/or nitrous acid in it. The nitric acid may, therefore be passed into the top of at least one so-called "bleaching tower" in which it is contacted by an ascending stream of air effective to remove the dicolouration. The gas leaving the top of the or each "bleaching tower" is returned to the or each absorption column.

If desired, one or more columns, the or each of which perform both the absorption and bleaching functions may be employed.

The absorption columns and other parts of the plant may be operated at just above atmospheric pressure (1.3 to 1.5 bar), medium pressure (i.e., 3 to 6 bar) or high pressure (8 to 12 bar).

Proposals have been made to improve upon existing processes by adding substantially pure oxygen to the gas passing through the absorption column or columns. However, none of these proposals appears to be based on a full appreciation of the consequences of adding oxygen at different parts of the absorption column or columns. Moreover, we believe that none of these proposals has been reduced to regular commercial practice.

The present invention is particularly concerned with performing the oxygen-enrichment of gases entering and passing through the absorption zone or zones in a manner which has due regard for the various factors which influence the efficiency of the absorption zone or zones. The invention has as an object the provision of a process whereby fully efficient use of the gas used for oxygen enrichment is made possible.

Further objects of the invention include the improvement of established processes by oxygen-enrichment to give one or more of the following advantages:

a reduction in the concentration of oxides of nitrogen in the vent gas;

an increase in the rate of production of nitric acid, and an increase in the concentration of the product acid.

According to the present invention there is provided a gas-liquid contact process for making nitric acid including the steps of:

(a) reacting primary air and ammonia catalytically at elevated temperature to form a gas comprising nitric oxide, nitrogen, oxygen and water vapour;

(b) cooling the gas to a temperature at which water vapour condenses;

(c) introducing the cooled gas into one or more columnar absorption zones and contacting it countercurrently with water and thereby forming product nitric acid;

(d) passing the product nitric acid into a bleaching zone wherein bleaching air is passed through the product nitric acid;

(e) enriching the bleaching air in oxygen, in, upstream of, or downstream of, the bleaching zone;

(f) passing secondary air through the or each absorption zone with the cooled air, the secondary air being constituted at least in part by the oxygen-enriched bleaching air;

(g) enriching in oxygen the gas passing through the absorption zone(s) at one or more regions where the absorption reaction is from 50 to 90% complete.

The process according to the invention makes it possible to achieve particularly favourable conditions in the absorption zone or zones for the chemical reactions that take place. These reactions are:

$$3NO_2 + H_2O = 2HNO_3 + NO \text{ and}$$
$$2NO + O_2 = 2NO_2 = N_2O_4$$

When the cooled gas first comes into contact with water in the absorption zone or zones (i.e., the absorption reaction has not begun) we believe that provided the oxidation ratio of the gas is low, the residence time of the gas (which is inversely proportional to its velocity) is a more critical parameter than the oxygen partial pressure.

On the other hand, as the absorption reaction progresses more nitric oxide is formed and the partial pressure of oxygen in the gas becomes more critical. The process according to the present invention makes it possible to optimise the gas velocities and oxygen partial pressures in different regions of the absorption zone or zones.

By a low oxidation ratio we mean one in the order of 0.05 the oxidation ratio being expressed as $NO/(NO+NO_2)$ where NO represents the number of moles of nitric oxide in the gas entering the absorption zone, or the first absorption zone if there are more than one, and $NO_2$ represents the number of moles of nitrogen dioxide in the gas entering the said absorption zone. For the purpose of the oxidation ratio, each mole of dinitrogen tetroxide is treated as consisting of two moles of nitrogen dioxide.

A conventional plant for making nitric acid can readily be adapted to perform the process according to the invention. By making such a conversion it is possible to decrease the concentration of oxides of nitrogen in the gas vented from the absorption zone or zones, to increase the rate of production of nitric acid without increasing the concentration of oxides of nitrogen in the gas vented from the absorption zone or zones, or to increase the concentration of the product nitric acid without increasing the concentration of oxides of nitrogen in the gas vented from the absorption zone or zones.

Accordingly, the invention also provides a method of improving a process for making nitric acid, the process including the steps of:

(a) reacting primary air and ammonia catalytically at elevated temperature to form a gas comprising nitric oxide, nitrogen, oxygen and water vapour;

(b) cooling the gas to a temperature at which the water vapor condenses;

(c) introducing the cooled gas into one or more columnar absorption zones and contacting it counter-currently with water and thereby forming product nitric acid;

(d) passing the product nitric acid into a bleaching zone wherein bleaching air is passed through the product nitric acid;

(e) passing secondary air through the or each absorption zone with the cooled gas, the secondary air being formed at least in part by bleaching air taken from the bleaching zone;

The improvement being effected by:

1. making a reduction in the rate at which the bleaching air or other air is taken to form the secondary air;
2. enriching in oxygen the bleaching air upstream of, in, or downstream of the bleaching zone;
3. enriching in oxygen the gas passing through the absorption zone or zones at one or more regions where the absorption reaction is from 50 to 90% complete, and thereby performing the process according to the invention.

The temperature at which the catalytic reaction between ammonia and air is performed is typically the same as that at which it is performed in known processes e.g. between 830° and 950° C. The catalyst is typically a platinum-rhodium catalyst.

The gas from the catalytic reaction zone(s) is typically cooled by being passed through at least two heat exchangers. In the heat exchangers oxygen in the gas reacts with the nitric oxide to form nitrogen dioxide which is in tautomeric equilibrium with its dimer dinitrogen tetroxide. The more or most downstream heat exchanger will typically be adapted to function as a condenser, in which, in operation of the process, the water vapour condenses. The nitrogen dioxide will react with the condensate to form a dilute solution of nitric acid and nitric oxide. The so-formed dilute nitric acid is typically introduced into the absorption zone or zones at one or more chosen locations and becomes united with the nitric acid being formed in the absorption zone or zones. Typically, the gas is cooled to a temperature at or near to ambient (i.e., between 0° and 100° C.). Preferably it is cooled to 40° to 80° C.

In the or each absorption zone gas-liquid contact surfaces are typically provided by sieve trays along which liquid flows in operation of the process, descending from tray-to-tray and contacting gas ascending through apertures in the trays. It is possible, however, to use other devices to provide thorough contact between the gas and liquid. For example, bubble-cap trays may be used to provide gas-liquid contact surfaces.

There may be one or more absorption zones. If there is just one absorption zone, water (substantially pure or containing nitric acid in solution) may be introduced into the top of the zone and the cooled gas and secondary air at the bottom of the zone. As the water descends the zone (or column) so it becomes progressively richer in nitric acid, while as the united cooled gas and secondary air ascends so progressively more of its nitrogen dioxide (or dinitrogen tetroxide) takes part in the absorption reaction to form nitric acid. Moreover, as the gas ascends the absorption zone, nitric oxide reformed by the absorption reaction is reconverted into nitrogen dioxide which is subsequently absorbed. By the time the gas reaches the top of the absorption zone, substantially all the oxides of nitrogen have been removed therefrom. The remaining gas is typically vented to the atmosphere.

Instead of there being just one absorption zone there may be a series of such zones. In the first zone encountered by the cooled gas and secondary air by no means all of the oxides of nitrogen are removed from the gas. Thus, the gas leaving the top of the first absorption zone is taken from this zone and passed into the bottom of a second absorption zone, and so one until substantially all the oxides of nitrogen are removed therefrom. Typically water is introduced into the top of the last zone encountered by the gas, and the resultant dilute nitric acid collecting at the bottom of this zone passed into the next-to-last zone, and so on. Thus, the product nitric acid is collected at the bottom of the first zone.

The bleaching zone may be situated within a column or tower separate from the absorption zone(s) (or column(s). Alternatively, it is possible to provide the bleaching zone within the same column as that which defines the absorption zone, or, if there is more than one absorption zone, the same column as that in which the product nitric acid is collected. If a single column defines both an absorption zone and a bleaching zone, the cooled gas will not be introduced right at the bottom of this column, but, instead, some distance up. Thus, the level at which the cooled gas is introduced defines the boundary between the absorption zone and the bleaching zone in that column. In such an instance, the bleaching air would typically be enriched in oxygen upstream of the bleaching zone, and the seondary air would typically be formed entirely of the oxygen-enriched bleaching air.

The bleaching air, so it is believed, performs two main functions. The first is to strip dissolved gases from the product nitric acid. The second is to oxidise impurities in the product nitric acid. Thus the bleaching air is able to remove discolouration (if any) from the product nitric acid.

The bleaching air is preferably enriched in oxygen upstream of (or in) the bleaching zone. Preferably, the bleaching air is enriched in oxygen to form a gas mixture containing from 25 to 45% by volume of oxygen. Preferably, the oxygen is used to enrich the bleaching air is commercial oxygen by which is meant pure oxygen or a gas mixture containing at least 90% by volume of oxygen. Alternatively oxygen-enriched air containing at least 40% by volume of oxygen may be used.

The main advantage of enriching the bleaching air in oxygen upstream of or in the bleaching zone is that it makes possible the selection of a rate of feeding secondary air into the absorption zone or zones which can give favourable residence times (or gas velocities) and oxygen partial pressures at the bottom of the column. This is perhaps best illustrated by reference to the conversion of a conventional process to one in accordance with the invention. Since the effective bleaching of the product nitric acid is in part dependent on the rate at which oxygen passes through the bleaching zone, the rate at which the bleaching air enters the bleaching zone may be reduced without the rate at which oxygen passes therethrough being substantially altered. Consequently the rate at which secondary air enters the absorption zone or zones is reduced. This makes it possible to achieve a reduction in the gas velocity of the cooled gas and secondary air entering the column. Hence, it is possible to increase the residence time of the gases in the first part of the absorption zone or zones. This, as aforementioned, is a favourable charge to make in the part of the absorption zone or zones which is first encountered by the cooled gas. Moreover, an increase in the partial pressure of oxygen in this part of the column can be achieved.

Since in most existing plants the primary air and the bleaching air are taken from the same compressor (or bank of compressors), reducing the rate at which the bleaching air is used makes it possible to reduce the load on the compressor or compressors and hence the power consumed or to increase the rate at which air is passed into the catalytic reaction zone in which the oxidation of ammonia takes place. It is thus possible to produce more nitric oxide in the reaction zone by correspondingly increasing the rate at which ammonia is fed into the reaction zone. Thus, by adopting the process according to the invention, it is possible to increase the rate at which oxides of nitrogen enter the absorption zone or zones.

Irrespective of whether or not the rate at which oxides of nitrogen enters the absorption zone or zones is increased an increase in the residence time of the gases is in the first part of the absorption zone or zones will increase the extent to which the absorption reaction takes place in the bottom of the absorption zone or in the first absorption zone (if there is more than one absorption zone). Addition of commercial oxygen (i.e. pure oxygen or gas mixture containing at least 90% by volume of oxygen) or oxygen-enriched air to the gas passing through the absorption zone or zones makes it possible to reconvert to nitrogen dioxide substantially all the nitric oxide formed as a result of the absorption reaction. This oxygen is added at one or more regions where the absorption reaction is from 50 to 90% complete (having regard to the quantity of oxides of nitrogen in the gas at such region or regions in comparison to the quantity in the cooled gas entering the absorption zone or zones). At such regions the residence time of the gas is not such a critical parameter as the partial pressure of oxygen, so it is possible to make relatively large increases in the partial pressure of oxygen there.

The amount per unit time of oxygen that is required to be added at such region will depend on whether or not the rate at which oxides of nitrogen enter the absorption zone or zones is increased. If this rate is not increased and it is the intention to reap the advantage of the oxygen additions by a reduction in the concentration of oxides of nitrogen in the gas vented from the absorption zone or zones, typically 1 volume of oxygen may be added to the gas passing through the absorption zone or zones for each 9 to 10 volumes of extra oxygen added to the bleaching air. If, however, the rate at which oxides of nitrogen enter the absorption zone or zones is increased, typically up to 4 volumes of oxygen may be added to the gas passing through the absorption zone or zones for each 6 volumes of extra oxygen added to the bleaching air.

An increase in the rate at which oxides of nitrogen enter the absorption zone or zones may be exploited by increasing the concentration of the product acid, or by increasing the rate of production of product acid, or by obtaining both advantages.

The increase in the rate of production of nitric acid may be achieved by increasing the rate at which water is passed through the absorption zone or zones. If no such increase in the rate at which water is passed through the absorption zone or zones is made then an increase in the concentration of the product nitric acid may be achieved. Indeed, it may be possible to reduce the rate at which water is passed through the absorption zone or zones and thereby achieve an even larger increase in the concentration of the product nitric acid. Both the increase in the rate of production of acid and/or the increase in its concentration can be achieved without increasing the concentration of oxides of nitrogen in the gas vented from the absorption zone or zones.

Since the process according to the invention makes it possible to reduce the rate at which bleaching air is taken to form the secondary air, it is possible to increase the ratio of primary air to secondary air when converting an existing process to one in accordance with the present invention. In absolute terms, if the oxygen-enriched bleaching air contains 25 to 45% by volume of oxygen, the ratio:

$$(A_B + A_E)/(A_B + A_E + A_P)$$

expressed as a percentage is preferably in the range 5 to 12%. wherein:

$A_B$ represents the rate (mass per unit time) at which air is taken to form the bleaching air;

$A_E$ represents the rate (mass per unit time) at which air (other than oxygen-enriched air) is added to the bleaching air to form the secondary air, and $A_P$ represents the rate (mass per unit time) at which the primary air enters the catalytic reaction zone(s).

Preferably this ratio is in the range 5 to 8%.

Typically, no extra air needs to be added to the bleaching air to form the secondary air (i.e. $A_E = 0$). However, if a plant for performing a conventional process has a pipe for supplying such additional air to the absorption zone or zones, it is possible to reduce the rate at which such additional air is supplied, rather than reducing the rate at which bleaching air is supplied to the absorption zone or zones. Moreover, the oxygen (typically pure) or oxygen-enriched air used to enrich the bleaching air may be premixed with the additional air that is added to the bleaching air to form the secondary air. However, this is not preferred. Moreover, in many, if not most, plants such additional air from the atmosphere is not employed.

Preferably, commercial oxygen (as hereinbefore defined) used to enrich in oxygen the gas passing through the absorption zone or zones, is introduced into such zone or zones at a rate in the range of 2 to 15% of that at which the cooled gas enters the absorption zone or zones.

Preferably, the gas passing through the absorption zone or zones is enriched in oxygen at one or more regions where the absorption reaction is from 70 to 90% complete.

Typically the amount of oxygen that is added is such that the gas vented from the absorption zone or zones contains from 4.5 to 7% by volume of oxygen.

In converting an existing process to operation in accordance with the invention, it is preferred that the enrichment in oxygen of the bleaching air should be carried out so as to increase the partial pressure of the oxygen at the region of the absorption zone or zones where the bleaching air becomes mixed with the cooled gas by 10 to 20%. Furthermore, it is preferred that the reduction in the rate at which bleaching air is taken to form the secondary air is sufficient to reduce the velocity of the gas passing through the absorption zone of zones by from 5 to 18%, the said velocity being that at the location where the bleaching air units with the cooled gas. In addition, it is preferred that the enrichment in oxygen of the gas passing through the absorption zone or zones is sufficient to increase by 30 to 100% the partial pressure of oxygen in the gas at the region where the enriching gas unites with the oxygen passing through the column.

Performing the process according to the present invention, makes it possible to obtain a reduction in the operating pressure of the or each operating zone. In some instances, we believe, it may also be possible to reduce the number of absorption columns that are used if a plant contains two or more columns.

In converting an existing plant to operation in accordance with the present invention it is not necessary to increase the rate at which molecular oxygen flows through the bleaching zone. Thus, it is possible to avoid making a significant increase in the dissolved oxygen in the nitric acid product. Any such increase in the dissolved oxygen concentration would be troublesome if the product nitric acid is produced at elevated pressure and then subjected to a reduction in pressure.

The result of such a reduction in pressure would be an emission of oxygen which could be a fire hazard.

Those skilled in the art of designing plants for making nitric acid will appreciate that a new plant may be custom built for operating the process according to the invention.

If a new plant is built to operate the method according to the present invention, analogous advantages to those described above may be achieved. In addition, the process according to the present invention may offer an increased flexibility in selecting the wall-thickness of the or each absorption column, the number of trays, the number of columns, their height and diameter, size of the bleaching tower and the size of the compressors.

Typically product nitric acid of from 50 to 70% strength may be produced by the process according to the invention.

The invention will now be described by way of example with reference to the accompanying drawing which is a circuit diagram showing a plant for manufacturing nitric acid.

Referring to the drawing, the illustrated plant includes a pipeline 1 for incoming air which is connected to the inlet of a compressor 3. The outlet of the compressor 3 is connected to a heat exchanger 5. The heat exchanger 5 has an outlet in communication with a pipeline 7 for cooled air. The pipeline 7 terminates in a union with a pipeline 8 and a pipeline 10. The pipeline 10 is in communication with the inlet of a catalytic converter or burner 17 and, upstream of the converter or burner 17, is joined by a pipe 12 through which ammonia from a source (not shown) may be introduced into the pipeline 10 and become mixed with the air before it enters the converter or burner 17.

The converter or burner 17 has an outlet for reaction or combustion products in communication with a line 18 in which are disposed a first heat exchanger 19 and a second heat exchanger 22, which also functions as a condenser. The condenser 22 has a first outlet in communication with a line 23 which terminates in an inlet 24 to the bottom of an absorption column 28 containing a number of sieve trays or bubble cap trays (not shown).

The condenser 22 has a second outlet in communication with a line 26 which terminates in an inlet 29 to the column, through with inlet fluid may be introduced into the column 28 at an intermediate level thereof.

The absorption column 28 also has an inlet 42 through which water may be introduced into the top of the column; an outlet 40 through which gas may be vented from the top of the column and an inlet 30 through which oxygen or oxygen-enriched air may be introduced into the column at a level above that at which fluid from the line 26 is introduced into the column but below that at which water is introduced thereto through the inlet 42.

The absorption column 28 also has an outlet line 36 in communication with an inlet 37 situated at the top of a bleaching tower 34. The bleaching tower has at its top a gas outlet in communication with a passage 38 which terminates in the pipeline 23. The bleaching tower 34 also has an outlet 44 for nitric acid and an inlet near its bottom in communication with a passage 8 which meets the previously-mentioned pipelines 7 and 10 in a common union. The passage 8 has in communication with it a pipe 32 through which commercial oxygen or oxygen-enriched air may be passed into the passage 8 from a source (not shown).

In operation of the plant air may be passed through the compressor 3 where it is compressed from atmospheric pressure to a chosen pressure in the range from just greater than one bar to twelve bars. The air is then heated in heat exchanger 5. Part of the air is then passed via line 8 into the bleaching tower 34. The majority, however, passes into the line 10 and becomes mixed with ammonia introduced via line 12. This mixture passes via line 10 into the converter 17 where the ammonia is burned to form nitric oxide.

The combustion products consisting mainly of nitric oxide, nitrogen, water vapour and oxygen leave the burner 17 via line 18 and then pass through the heat exchanger 19 and the condenser 22. The outlet temperature of the gas leaving the condenser 22 is in the order of 40°–80° C.

In the condenser 22 some of the nitric oxide will react with oxygen in the gas mixture therewith to form nitrogen dioxide. Nitrogen dioxide then undergoes a dimerisation reaction to form dinitrogen tetroxide. The nitrogen dioxide and dimitrogen tetroxide react with water vapour condensed in the condenser so as to form dilute nitric acid. The dilute nitric acid is introduced into the absorption column 28 through the inlet 29.

Uncondensed gases leaving the condenser 22 enter the bottom of the absorption column 28 through the inlet 24. These gases pass upwardly through the trays in the column 28 and contact water descending the column, the water having been introduced through the inlet 42. Before entering the column through the inlet 24 the uncondensed gases from the condenser 22 are joined by vent gases leaving the bleaching tower 34 via the passage 38.

In the column, dinitrogen tetroxide and nitrogen dioxide react with water to form nitric acid and nitric oxide. The nitric oxide reacts with oxygen to form nitrogen dioxide which dimerises. The dinitrogen tetroxide so formed reacts with the water to form more nitric acids, and nitric oxide, and so on. Oxygen or oxygen-enriched air is introduced into the column 28 via the inlet 30. The oxygen so-introduced helps to promote conversion of nitric oxide to nitrogen dioxide and its dimer. The inlet 30 is situated at a level such that the oxygen or oxygen-enriched air enters the column and unites with the gas passing through the column at a location where the absorption reaction is from to 70 to 90% complete.

Unabsorbed gas is vented from the column through the line 40. Nitric acid collected at the bottom of the column is passed into the top of the bleaching tower where it is contacted with air introduced into the column via the passage 8. This air is enriched in oxygen by the addition of oxygen through the line 32. The action of the oxygen-enriched air introduced into the bleaching tower 34 is to oxidise impurities in the nitric acid and also to strip from the nitric acid any dissolved oxides of nitrogen. The oxygen-enriched air is taken as secondary air and united with the cooled nitric oxide containing gas mixture as it enters the absorption column. Nitric acid product is taken from the bleaching column 34 via the line 44.

Typically, the vent gas leaving the plant through the line 40 will consist mainly of nitrogen, with small quantities of oxygen and 1500 ppm or less of oxides of nitrogen, depending on the pressure at which the absorption column is operated.

The invention is further illustrated by the following example which is based on a computer model of the process:

EXAMPLE

This example relates to the uprating of a standard plant (such as that illustrated in the accompanying drawing) for making nitric acid. The bottom few trays in the column constitute an oxidation zone which does not receive product nitric acid. In this oxidation zone the oxidation ratio of the incoming gas is appropriately reduced. The plant when operated conventionally is intended to produce 14.8 tonnes/hr of nitric acid in a 60% solution.

In conventional operation, 5.440 m3/hr of air are mixed at a pressure of 5 bar and passed to the ammonia burner. Ammonia is passed into the burner at a rate sufficient to form a gas comprising 10.4% by volume of nitric oxide, 5.0% by volume of oxygen, 16.0% by volume of water vapour, and the remainder nitrogen.

The gas mixture is then cooled in a waste heat boiler and then two cooler-condensers where dilute nitric acid is formed at a concentration of 55% by weight. The remainder of the gases are mixed with secondary air to form a gas mixture comprising by volume 2.8% of nitric oxide, 5.8% of nitrogen dioxide (molecules of dinitrogen tetroxide are treated as two molecules of nitrogen dioxide), 5.7% of oxygen, and 0.6% of water, the remainder being nitrogen. The gas mixture is introduced into the bottom of an absorption column. The gas velocity at the bottom of the column is 0.15 meters per second. It becomes progressively smaller as the reaction proceeds in the column. The unabsorbed gases leaving the absorber have the following composition oxides of nitrogen 1500 ppm, 2.85% by volume of oxygen, and the remainder being nitrogen.

The product nitric acid is passed into a bleaching column where compressed air is passed through the acid at a fifth of the rate at which it enters the burner. The gas leaving the bleaching column is taken to form the secondary air.

The plant is uprated by 10% so that 16.3 tonnes per hour of nitric acid dissolved in sufficient water to produce 60% acid. The rate at which bleaching air is passed into the bleaching column is reduced by 45% by volume and the extra compressed air thus produced is passed into the burner. In addition the rate of flow of ammonia into the burner is increased by 10% so that the relative proportions of the air and ammonia entering the burner remain unaltered.

Pure oxygen is added to the bleach air such that the quantity of oxygen flowing through the bleaching column is unaltered. Thus, a bleaching gas comprising oxygen-enriched air containing 33% by volume of oxygen, and 67% by volume of nitrogen is formed. This results in a total reduction of 36% in the rate of flow of gas through the bleaching column. In addition, there is a corresponding reduction in the rate of flow of secondary air into the absorption column. This leads to a reduction in the gas velocity at the bottom of the column, the reduced velocity being 0.13 m/sec. As, however, the total flow rate of oxygen into the absorption column is unaltered, it is necessary to add extra oxygen as to prevent the concentration of oxides of nitrogen in the vent gas from increasing. Oxygen (substantially pure) is added to the column at a region where the absorption reaction is from 50 to 90% complete. Typically, in a column containing about 30 trays, this may be above the 8th tray from the bottom. The rate of adding oxygen is sufficient above this tray to increase the oxygen in the vent gas to 4.5 to 7% by volume. Thus the total oxygen added (both to the bleaching air and to the gas passing through the absorption column) amounts to 0.85 tonne for each extra tonne of nitric acid produced.

We claim:

1. In a gas-liquid contact process for making nitric acid including the steps of:
   (a) reacting primary air and ammonia catalytically at elevated temperature to form a gas comprising nitric oxide, nitrogen, oxygen and water vapour;
   (b) cooling the gas to a temperature at which water vapour condenses;
   (c) introducing the cooled gas into one or more columnar absorption zones and contacting it countercurrently with water and thereby forming product nitric acid;

(d) passing the product nitric acid into a bleaching zone wherein bleaching air is passed through the product nitric acid;

(e) passing secondary air through the or each absorption zone with the cooled gas, the secondary air being constituted at least in part by the bleaching air;

the improvement comprising performing the following steps:

(1) enriching the bleaching air in oxygen, in, upstream of, or downstream of, the bleaching zone;

(2) enriching in oxygen the gas passing through the absorption zone(s) at one or more regions where the absorption reaction is from 50 to 90% complete.

2. A process according to claim 1, in which the secondary air is constituted entirely by oxygen-enriched air which has passed through the said bleaching zone.

3. A process according to claim 1, in which the oxygen-enriched bleaching air contains 25 to 45% by volume of oxygen.

4. A process according to claim 3, in which the ratio:

$$(A_B + A_E)/(A_B + A_E + A_P)$$

expressed as a percentage is the range 5 to 12%, wherein:

$A_B$ represents the rate (mass per unit time) at which air is taken to form the bleaching air;

$A_E$ represents the rate (mass per unit time) at which air is added to the bleaching air to form the secondary air, and $A_P$ represents the rate (mass per unit time) at which the primary air enters the catalytic reaction zone(s).

5. A process according to claim 4, in which the ratio is in the range 5 to 8%.

6. A process according to claim 1, in which pure oxygen or gas mixture containing at least 90% by volume of oxygen is used to enrich in oxygen the gas passing through the absorption zone or zones, the commercial oxygen being introduced into the absorption zone or zones at a rate in the range 2 to 15% of that at which the cooled gas enters the absorption zone or zones.

7. A process according to claim 6, in which the gas passing through the absorption zone or zones is enriched in oxygen at one or more regions where the absorption reaction is from 70 to 90% complete.

8. A process according to claim 4, in which the gas vented from the absorption zone or zones contains from 4.5 to 7% by volume of oxygen.

9. In a process for making nitric acid, including the steps of:

(a) reacting primary air and ammonia catalytically at elevated temperature to form a gas comprising nitric oxide, nitrogen, oxygen and water vapour;

(b) cooling the gas to a temperature at which water vapour condenses;

(c) introducing the cooled gas into one or more columnar absorption zones and contacting it countercurrently with water and thereby forming product nitric acid;

(d) passing the product nitric acid into a bleaching zone wherein bleaching air is passed through the product nitric acid;

(e) passing secondary air through the or each absorption zone with the cooled gas, the secondary air being constituted at least in part by bleaching air taken from the bleaching zone;

the improvement comprising:

1. making a reduction in the rate at which the bleaching air or any other air is taken to form the secondary air;

2. enriching the bleaching air in oxygen upstream of, in or downstream of the bleaching zone;

3. enriching in oxygen the gas passing the absorption zone or zones at one or more regions where the absorption reaction is from 50 to 90% complete.

10. A process according to claim 9, in which the enrichment in oxygen of the bleaching air increases the partial pressure of the oxygen at the region of the absorption zone or zones where the bleaching air becomes mixed with the cooled gas by 10 to 20%.

11. A process according to claim 9, in which the reduction in the rate at which bleaching air is taken to form the secondary air is sufficient to reduce the velocity of the gas passing through the absorption zone or zones by from 5 to 18%, the said velocity being that at the location where the bleaching air unites with the cooled gas.

12. A process according to claim 9, in which the enrichment in oxygen of the gas passing through the absorption zone or zones is sufficient to increase by 30 to 100% the partial pressure of oxygen in the gas at the region where the enriching gas unites with the oxygen passing through the column.

* * * * *